US009086699B2

(12) United States Patent
Pirotais

(10) Patent No.: US 9,086,699 B2
(45) Date of Patent: Jul. 21, 2015

(54) AGRICULTURAL TRACTOR CONTROL SYSTEM AND METHOD

(75) Inventor: Jacques Pirotais, Glatingy (FR)

(73) Assignee: AGCO SA, Beauvais (FR)

( * ) Notice: Subject to any disclaimer, the term of this patent is extended or adjusted under 35 U.S.C. 154(b) by 4 days.

(21) Appl. No.: 13/877,489

(22) PCT Filed: Sep. 15, 2011

(86) PCT No.: PCT/EP2011/066003
§ 371 (c)(1),
(2), (4) Date: Jul. 15, 2013

(87) PCT Pub. No.: WO2012/045559
PCT Pub. Date: Apr. 12, 2012

(65) Prior Publication Data

US 2013/0289832 A1    Oct. 31, 2013

(30) Foreign Application Priority Data

Oct. 4, 2010 (GB) .................................. 1016653.6

(51) Int. Cl.
*G06F 17/00* (2006.01)
*A01B 79/00* (2006.01)
(Continued)

(52) U.S. Cl.
CPC .............. *G05D 1/021* (2013.01); *A01B 69/008* (2013.01); *A01B 79/005* (2013.01); *B60K 37/00* (2013.01)

(58) Field of Classification Search
CPC ........... E02F 3/435; E02F 3/325; E02F 3/841; E02F 9/2003; B66C 23/78; B60L 2200/40; A01B 69/008; A01B 69/007; G05D 2201/0201
See application file for complete search history.

(56) References Cited

U.S. PATENT DOCUMENTS 4,715,012 A    12/1987 Mueller, Jr.
6,131,062 A *  10/2000 Nielsen .......................... 701/50
(Continued)

FOREIGN PATENT DOCUMENTS

EP    0824860 A1    2/1998
EP    1714539 A1    10/2006
(Continued)

OTHER PUBLICATIONS

International Search report for International Application No. PCT/EP2011/066003 Dated Dec. 29, 2011.
(Continued)

*Primary Examiner* — James Trammell
*Assistant Examiner* — Demetra Smith-Stewart

(57) ABSTRACT

An agricultural tractor (10) control system comprising an electronic control unit (ECU) (16) is provided in addition to a method of controlling a tractor (10). The ECU (16) is arranged to receive in real time signals from a plurality of sensors (40, 42) associated with operating functions of the tractor. The ECU (16) is also arranged to output control signals to a plurality of controlled operating components. Macroinstructions, or macros, are inputted to the ECU (16) by a user by direct definition or Internet download for example. Each macro comprises a condition and a command. The condition includes a trigger value and a corresponding input variable sensed by a respective sensor (40, 42, 50). The command involves the transmission of one of said output control signals to control an operating component in a predetermined manner. The ECU (16) is operable to run said macro during which the command is executed in response to the condition being met.

16 Claims, 7 Drawing Sheets

(51) Int. Cl.
    *G05D 1/02*     (2006.01)
    *A01B 69/04*    (2006.01)
    *B60K 37/00*    (2006.01)

(56) References Cited

U.S. PATENT DOCUMENTS

| | | | |
|---|---|---|---|
| 8,583,326 B2* | 11/2013 | Collins et al. | 701/41 |
| 8,594,879 B2* | 11/2013 | Roberge et al. | 701/23 |
| 8,639,416 B2* | 1/2014 | Jones et al. | 701/41 |
| 2009/0271067 A1* | 10/2009 | Underdal et al. | 701/35 |
| 2009/0319131 A1* | 12/2009 | Burns et al. | 701/48 |
| 2010/0312428 A1 | 12/2010 | Feller et al. | |
| 2011/0196565 A1* | 8/2011 | Collins et al. | 701/26 |
| 2012/0007763 A1* | 1/2012 | Hale et al. | 341/176 |
| 2012/0174445 A1* | 7/2012 | Jones et al. | 37/197 |

FOREIGN PATENT DOCUMENTS

| | | |
|---|---|---|
| FR | 2723792 A1 | 2/1996 |
| GB | 2318651 A | 4/1998 |
| WO | WO-00/43866 A1 | 7/2000 |

OTHER PUBLICATIONS

GB Search Report for GB Application No. GB1016653.6 Dated Feb. 4, 2011.

* cited by examiner

AGRICULTURAL TRACTOR CONTROL SYSTEM AND METHOD

The invention relates to control systems for agricultural tractors which comprise electronic control units arranged to receive a plurality of real time operating parameters each associated with operating functions of the tractor and arranged to output control signals to a plurality of operating components.

For many decades the complexity of tractor control has increased to the point where modern tractors today include electronic control units (ECUs) to control various operating components on the tractor either automatically or in response to driver commands. The ECU of a typical modern tractor will also receive signals from various sensors on the vehicle and which are representative of real time operating parameters each associated with operating functions of the tractor.

By way of example a typical ECU receives signals that are representative of ground speed, ground acceleration, wheel slip, direction of travel, engine speed, engine temperature, engine load, power take off (PTO) speed, steering angle, rear hitch position, front hitch position, and hitch draft. Many, if not all, of these real time parameters are communicated to the driver, or at least are available upon request via a driver terminal for example.

The operating components or functions which the ECU controls typically includes an engine, a transmission, a PTO system, a rear hitch system, a front hitch system, a steering system and an auxiliary hydraulic system. The ECU controls the transmission either automatically or in response to driver commands. Control of the transmission may include the selection of gear ratios and the engagement of four-wheel drive.

The multitude of sensed parameters and controllable functions presents the driver with many variables to consider simultaneously. To alleviate the burden upon the driver it is known to programme ECUs during manufacture with predetermined algorithms for the automatic control of operating components. For example, automatic engagement and disengagement of a four-wheel drive mode is commonly programmed into the ECU wherein four-wheel drive is automatically engaged in response to a sensed brake application at a sensed ground speed above a predetermined threshold, for example 5 km/hr.

In addition, to reduce the repetitive operations required by a driver when carrying out field work, electronic management systems may be provided and integrated with the ECU and/or driver terminal. For example, Datatronic (registered trade mark), an operating system available on Massey Ferguson (registered trade mark) tractors, includes a headland management system. This gives the driver the ability to programme a sequence of operations which can be manually programmed or recorded in real time. At the press of a button the ECU will enact the pre-programmed sequence at the end of the each turn of work, that is on the headland. The 'off' sequence typically includes a reduction in gear ratio, the lifting of the implement and the disengagement of automatic guidance for example. When the tractor is subsequently turned round another press of a button enacts the 'on' sequence to lower the implement and recommence work, etc. Such a headland management system significantly reduces the burden upon the driver to carry out repetitive and complex sequences throughout the working day.

Despite the availability of headland management systems and pre-programmed control algorithms, there remains a drive to reduce the burden upon the driver to accurately control the various tractor functions. Moreover, headland management systems and pre-programmed algorithms cannot always cater for the variety of different modes of operation required for different implements.

It is therefore an object of the invention to provide a control system for an agricultural tractor which reduces the burden upon the driver of monitoring and controlling a multitude of operating parameters and components.

In accordance with a first aspect of the invention there is provided an agricultural tractor control system comprising an electronic control unit (ECU) arranged to receive a plurality of real time operating parameters each associated with operating functions of the tractor, and arranged to output control signals to a plurality of operating components, wherein the ECU is operable to receive and store a user-inputted macro comprising at least one condition and at least one command, the condition including an event of receiving of an operating parameter having a predetermined value and the command comprising the transmission of one of said output control signals, wherein the ECU is operable to run said macro during which the command is executed in response to the condition being met. By allowing the user, or driver, to enter a basic algorithm in the form of macro, various functions can be automated in a manner in which the driver defines the trigger conditions.

Addressees should appreciate that the term 'real time operating parameter' relates to signals received by the ECU which are representative of respective operating functions of the tractor. Typically, but not exclusively so, each operating parameter has an associated sensor such as a temperature or proximity sensor by way of example.

It should be understood that the term 'operating component' encompasses components of the tractor which have an associated controllable variable. For example, this may include a rear hitch, the controllable variable being the set height.

The term 'user inputted macro' is intended to correspond to a basic algorithm, or macroinstruction, the transmission of which to the ECU is the result of an action by the user. For example, this may include the manual entry of a macro into a user interface device or a user command causing the download of a macro from a data storage device or remote server. It should be understood that algorithms pre-programmed into an ECU during manufacture are not considered as user inputted for the purposes of this specification.

Advantageously, by allowing the driver to define algorithms to control variables on the tractor, automated control of the various functions can be tailored to the requirements of the driver and/or the specific implement attached at a given time. The invention involves the recognition that the level of automation desired varies from driver to driver and from implement to implement. By providing the driver with freedom to define customised algorithms the burden thereupon of controlling the multitude of variables is reduced.

The control system may further comprise a user interface device in communication with the ECU, wherein the user interface device is arranged to receive a macro from the user and transmit the macro to the ECU. The user interface device, as its name implies, acts as an intermediary between a user and the ECU. Typically, the user interface device forms all or part of a driver terminal which may or may not have a display associated therewith. In its most simplistic form, the user interface device may be a series of buttons or scroll wheels for example. However, in a preferred embodiment the user interface device includes a touch sensitive display.

Preferably the user interface device comprises data entry means which allows the user to define and input the macro.

Advantageously, this allows the driver to design and/or define basic algorithms whilst in the field.

The user interface device may be arranged to allow a user to select, as part of a condition definition process, an operating parameter from a displayed plurality of predetermined operating parameters. Such parameters may include at least one of ground speed, ground acceleration, wheel slip, direction of travel, engine speed, engine temperature, engine load, power take off speed, steering angle, rear hitch position, front hitch position and hitch draft. However, it will be appreciated that the aforementioned list is non-exhaustive and may include various other measureables.

Furthermore, the user interface device may be arranged to allow a user to define, as part of the condition definition process, said predetermined value which corresponds with the selected operating parameter. For example, when a user has selected ground speed as the operating parameter, a value for the ground speed is typically set by the user. For example, the total condition may take the form of 'ground speed=5 km/hr'.

The user interface device may be arranged to allow a user to select, as part of a command definition process, said command from a plurality of predetermined command options. By way of example only, the predetermined command options may include the switching on or off of a PTO drive, and the raising or lowering of a rear hitch. It should be appreciated that a multitude of predetermined command options may be made available to the user each being associated with an operating component of the tractor.

The user interface device may comprise a communications link with a remote or local electronic device, and wherein the user interface device can receive a predetermined macro from the remote or local electronic device via the communications link when commanded by a user. In addition to, or instead of, the manual entry of a macro the communications link offers the user the option to transfer a macro from another electronic device. For example, the user may download a macro from a website via the Internet or from an office computer. It should be appreciated that the communications link can be either wireless or wired. The user interface device may further comprise means to receive a data carrier (such as an SC card or USB memory stick) so that a macro stored on the data carrier can be downloaded to the ECU. Again this allows the user to transfer a macro from another electronic device.

In accordance with a second aspect of the invention a method of controlling an agricultural tractor comprising the steps of receiving a plurality of real time operating parameters each associated with operating functions of the tractor, outputting control signals to a plurality of operating components, receiving a user-inputted macro comprising at least one condition and at least one command, the condition including the receipt of a predetermined operating parameter value and the command comprising the transmission of one of said output control signals, storing said macro and, executing the command in response to the condition being met.

The method may further comprise the step of providing macro definition means which permit a user to define and input a macro. The macro definition means may include a plurality of displayed predetermined operating parameters from which the user can select an operating parameter to form a component of the condition. In a preferred embodiment the predetermined operating parameters are displayed in the form of icons on a touch sensitive display which can be simply selected by the user.

Furthermore, the macro definition means may include a plurality of displayed predetermined command options from which the user can select said command. Again, the predetermined command options such as 'PTO on' or 'PTO off' are displayed as icons on a display which is preferably touch sensitive.

The macro definition means may include a plurality of displayed logic operators to allow a user to define a relationship between a plurality of conditions corresponding to a single command. For example, one condition including a real time operating parameter with associated value may be linked to a second condition also including a trigger operating parameter value by an 'AND' function or an 'OR' function.

The step of receiving the macro may include the steps of receiving a data carrier from a user and reading data from the data carrier to extract a stored macro. Alternatively, the step of receiving the macro may include the steps of receiving a download command from the user and downloading a predefined macro from a remote or local electronic device.

Further advantages of the invention will become apparent from the following description of specific embodiments with reference to the appended drawings in which.

Figure 1:
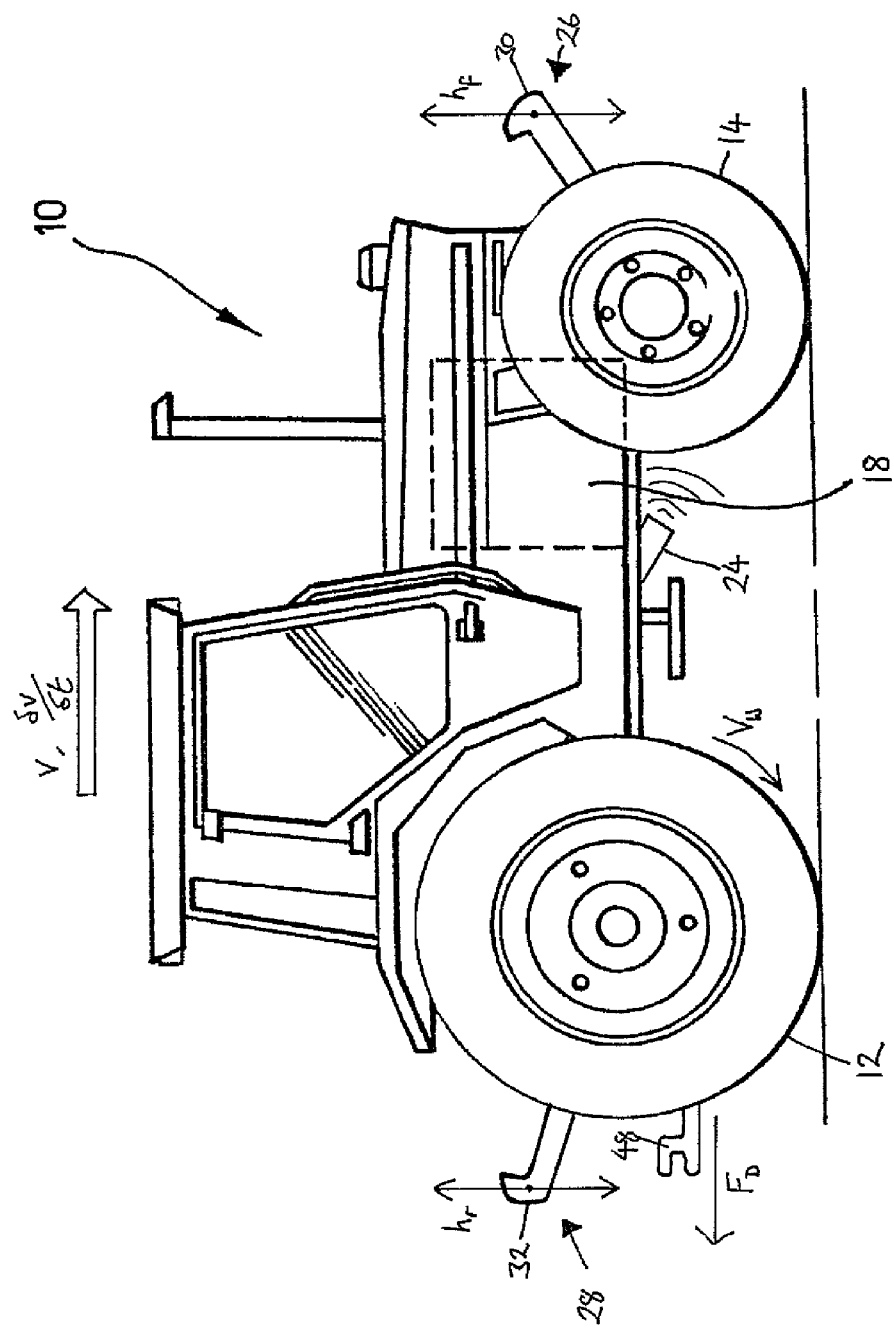
FIG. 1 is a schematic side view of an agricultural tractor illustrating a selection of operating functions and controllable variables.

With reference to FIG. 1, an agricultural tractor 10 comprises rear wheels 12 and steerable front wheels 14. The tractor 10 is of a known construction and will not be described in detail. The invention relates to the control system of the tractor 10 and so a selection of sensed operating functions and controllable operating components will be described hereafter.

Figure 2:
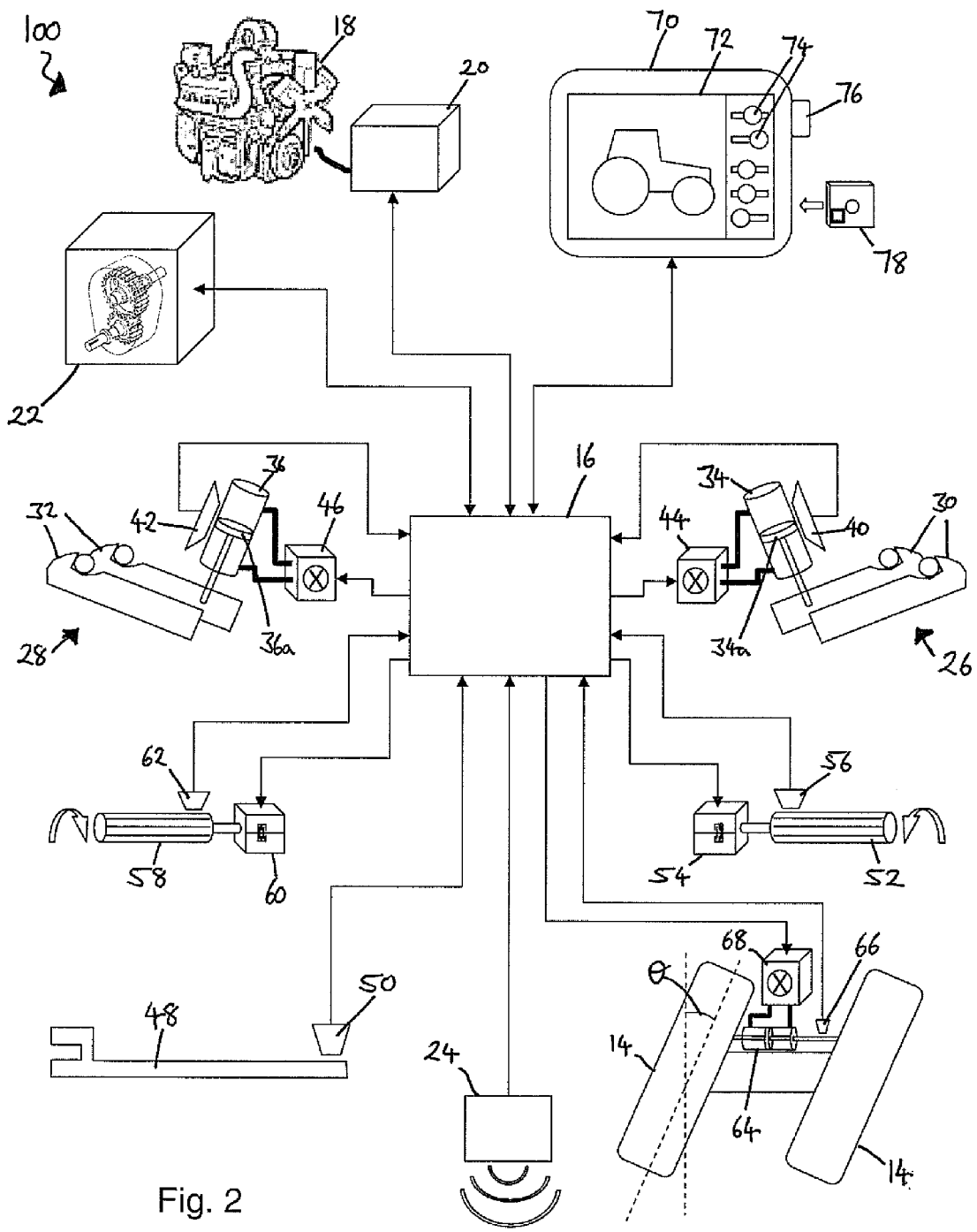
FIG. 2 is a schematic view of a control system in accordance with the invention shown with a plurality of controllable operating components and sensed functions upon the tractor of FIG. 1.

With reference also to FIG. 2 a control system 100 comprises an electronic control unit (ECU) 16 which includes a microprocessor operating in accordance with the invention. The various operating functions and components of the tractor connected to the ECU will now be described in turn.

Engine Management

The tractor 10 comprises an internal combustion engine 18 (designated by a dashed box in FIG. 1). An engine control unit 20 is connected to engine 18 and serves to sense a variety of real time operating parameters associated with the engine 18 and control a plurality of variables accordingly. It should be understood that engine control unit 20 may be integrated into ECU 16.

Sensors (not shown) measure the temperature of the engine 18, the engine speed and the engine load, each of which is considered a real time operating parameter for the purpose of this specification. The operating parameter values are preferably transmitted to the ECU 16 in real time.

Control signals are transmitted from the ECU 16 to the engine control unit 20 to control the speed of the engine 18. It should be appreciated that other controllable variables associated with the engine 18 may also be controlled by ECU 16 but only engine speed will be considered in this example.

Transmission

Tractor 10 comprises a transmission 22 of known construction and which serves primarily to deliver power (or torque) from engine 18 to the wheels 12,14 with a variable input-to-output speed ratio. Sensors (not shown) embedded in transmission 22 serve to sense the real time transmission ratio the resultant signals from which are transmitted to ECU 16. Control signals are transmitted in exchange from ECU 16 to transmission 22 to control the input-to-output ratio. It will be appreciated that transmission 22 may include ratio changing apparatus of known construction which may include clutches, hydraulic actuators and/or hydraulic pumps and motors. Furthermore the transmission may be of various constructions and types, the specific format not being critical to the invention. For example, the transmission may be of a stepped or stepless ratio type.

Together the engine 18 and transmission 22 dictate the ground speed (v) and acceleration ($\delta v/\delta t$) of the tractor. A sensor within the transmission 22 provides a real time operating parameter to the ECU 16 which is representative of the wheel speed $v_w$ of the tractor. A radar sensor 24 positioned on the underside of tractor 10 senses the ground speed v of the tractor. Fed with the real time ground speed and wheel speed, the ECU 16 determines the percentage wheel slip of the tractor which is preferably done in real time.

The ECU can control the engine and transmission together in an Engine Cruise Control mode in which the engine speed is maintained at a steady value. Alternatively, a Tractor Cruise Control mode can be run in which the engine and transmission are controlled so that the ground speed (or wheel speed) is maintained at a steady value.

Hitches and Drawbar

As in known tractor set-ups, tractor 10 comprises a front hitch 26 and a rear hitch 28 for the attachment of respective implements. Each hitch 26,28 comprises a respective pair of lower links 30,32 which form part of a known three-point linkage system. Front links 30 are lifted and lowered by hydraulic cylinders 34, only one of which is shown in FIG. 2 for clarity. Similarly, rear links 32 are lifted and lowered by hydraulic cylinder 36.

The height of the respective linkages 26,28 is sensed by respective sensor 40,42 which each measure the position of piston 34a,36a in the associated cylinders 34,36. The sensor readings representative of front hitch position $h_f$ and rear hitch position $h_r$ are transmitted to the ECU 16. It will be appreciated that front hitch position $h_f$ and rear hitch position $h_r$ are considered real time operating parameters for the purpose of the specification.

Each hitch 26,28 has associated therewith a hydraulic control unit 44,46 respectively each of which is hydraulically connected to the associated lift cylinders 34,36 for the purpose of controlling lifting and lowering thereof. Electrical control signals are transmitted from ECU 16 to the hydraulic control units 44,46 to control the height of the front hitch 26 and rear hitch 28.

Each hitch can be controlled in accordance with a plurality of different modes, as per tractors today. For example, the absolute height of the hitch may be set. Alternatively, a hitch may operate in a temporary or steady 'sink' mode in which the hitch is allowed to lower to its minimum height depending upon the behaviour of the attached implement and/or ground contour.

Furthermore, the tractor comprises a drawbar 48 extending from the rear thereof and which is provided to tow implements. The hitch draft $F_D$ is measured by sensor 50 associated with a drawbar support mechanism. The measured hitch draft $F_D$ is transmitted by sensor 50 to ECU 16 in the form of a real time operating parameter.

Power Take Off (PTO)

A front PTO stub 52 is driven via a front PTO clutch 54 in a known manner. A front PTO sensor 56 measures the rotational speed of front PTO stub 52 and transmits a corresponding signal in the form of a real time operating parameter to ECU 16. The engagement and disengagement of front PTO stub 52 is controlled by control signals transmitted from ECU 16 to front PTO clutch 54.

Similarly a rear PTO stub 58 is driven via a rear PTO clutch 60 which is controlled by control signals transmitted from ECU 16. Also a rear PTO sensor 62 measures the rotational speed of rear PTO stub 58 and transmits a corresponding signal in the form of a real time operating parameter to ECU 16.

Steering

The two front steerable wheels 14 are steered by means of a hydraulic actuator 64 in a known manner. A steering angle sensor 66 associated with the steering assembly senses the steering angle $\theta$ of the steerable wheels 14 and transmits a corresponding signal in the form of a real time operating parameter to the ECU 16.

The hydraulic actuator 64 is hydraulically connected to steering control unit 68, also of known construction. Control signals are transmitted from ECU 16 to hydraulic steering control unit 68 to control the steering angle of wheels 14.

It should be appreciated that wheels 14 may be steered either manually by commands from a driver or automatically by a vehicle guidance system such as AUTOGUIDE (registered trade mark) available on the current range of Massey Ferguson tractors. In the case of manual control of the steerable wheels the hydraulic control unit 68 may receive a mechanical input from a steering wheel (not shown) or an electrical signal sent via ECU 16 forming part of a steer-by-wire system.

Driver Terminal

A user interface device in the form of a terminal 70 includes a display 72, a plurality of sliding buttons 74, and a scrolling wheel 76. In this example the display 72 is touch sensitive although a conventional display may be used without deviating from the invention. Likewise the manual buttons 74 may be replace with alternative forms or excluded.

The terminal 70, typically mounted to the right-hand side of a driver in the cab, is in wired or wireless communication with ECU 16. Commands from the driver, and inputted via the terminal 70, are transmitted to ECU 16. Display 72 is driven by signals transmitted from ECU 16. The display 72 may, for example, display various real time operating parameters associated with various operating functions of the tractor.

The terminal 70 includes means to receive a data storage device such as an SC card 78. Furthermore, terminal 70 may communicate wirelessly with remote electronic devices.

Operating Examples

Figure 3:
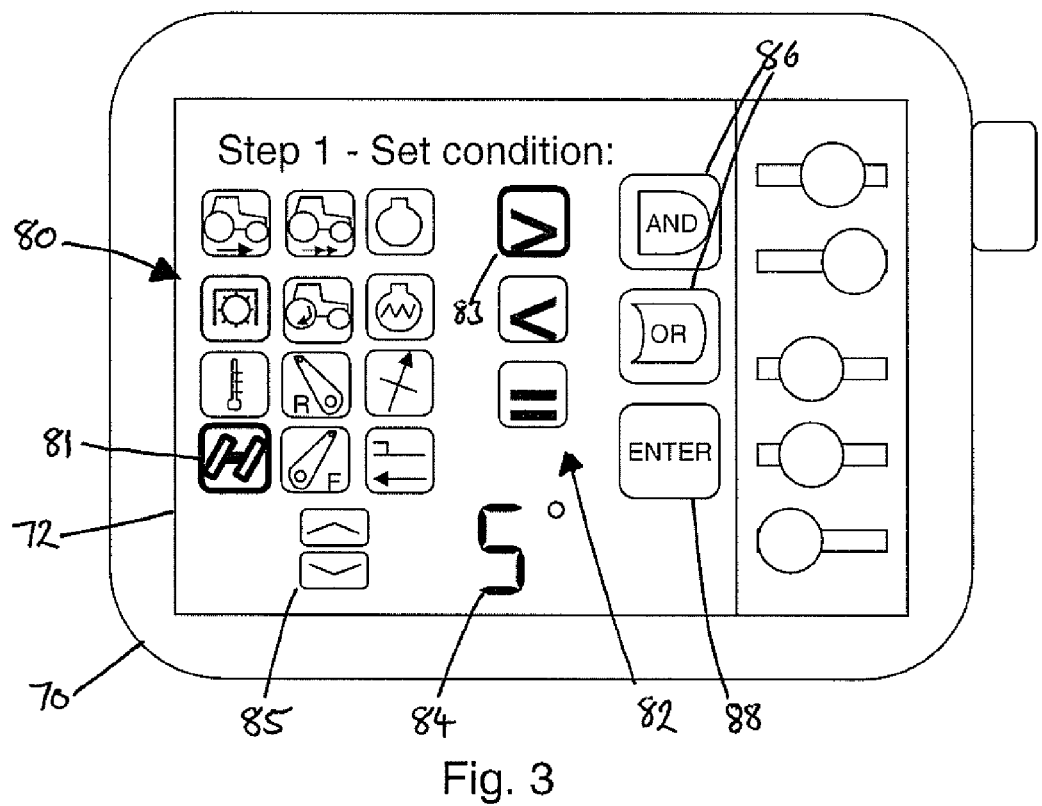
FIGS. 3 to 6 show a selection of images displayed on a driver terminal which is connected to an ECU operating in accordance with the invention.

The mechanism by which a driver may input a macro will now be described by way of example only. With reference to FIG. 3, in a first step display 72 presents the driver with the displayed buttons required to define a condition for a macro. On the left hand side of the display 72, twelve touch sensitive buttons 80 are displayed, each corresponding to a sensed operating parameter associated with operating functions of the tractor. In particular, starting from the top left button proceeding in rows to the right, the displayed buttons 80 correspond to:

ground speed v;
acceleration $\delta v/\delta t$;

engine speed;
PTO speed;
wheel slip;
engine load;
engine temperature;
rear hitch position $h_r$;
tractor direction;
wheel angle θ;
front hitch position $h_f$; and,
hitch draft $F_D$.

It should be appreciated that the variables presented may significantly differ from those shown in the example without deviating from the invention. In the example shown the driver has selected the wheel angle button 81 which is then displayed in bold form.

Position to the right of operating parameter buttons 80 are condition definition buttons 82, namely corresponding to greater than (>), less than (<) and equals (=) operators. In the examples shown the driver has selected the greater than button 83 which is displayed in bold form thereafter.

At the bottom of display 72 an operating parameter value, or 'trigger' 84 can be set by the driver by means of incremental buttons 85. In this example shown the driver has set a value of 5°.

Logic operator buttons 86 'AND' and 'OR' are displayed on the right hand side of display 72 and serve to allow a user to 'chain' together a plurality of conditions in a single macro.

In an example mode of operation, selection of one logic operator button 86 may reset the display shown in FIG. 3 thereby allowing a driver to make a further condition selection. However for the purpose of explanation, in this example, the driver presses the enter button 88 thus finishing the condition definition process.

Figure 4:
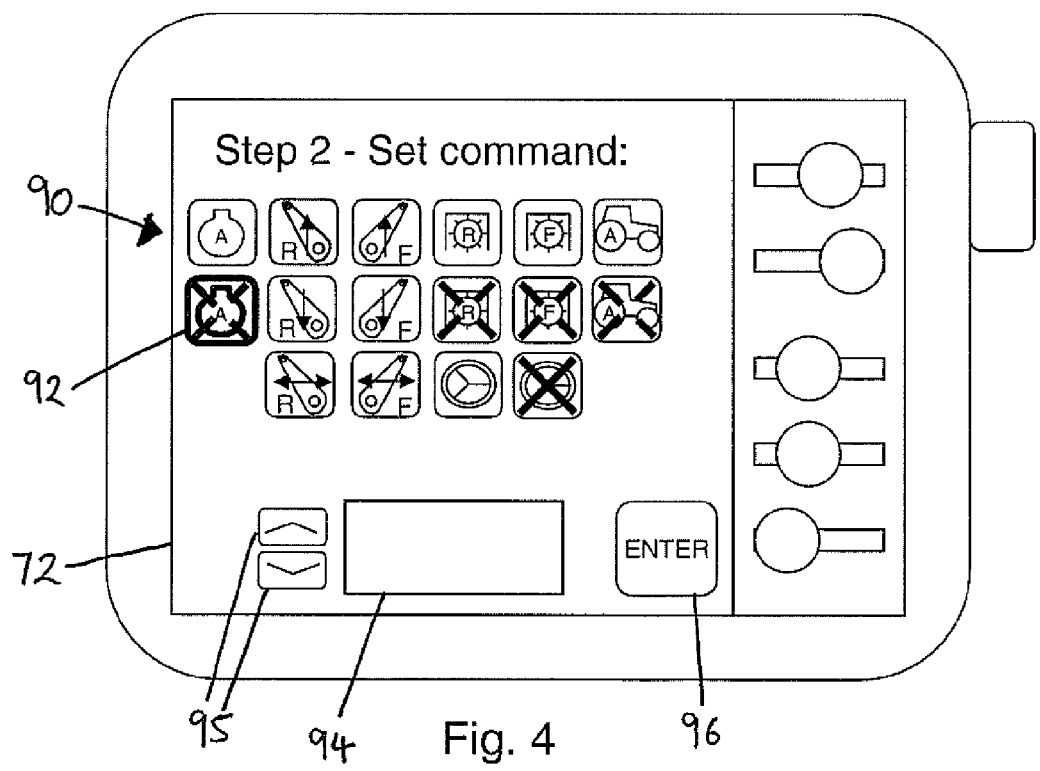

Following the definition of the condition (or conditions) as illustrated in FIG. 3, the display 72 displays a series of touch sensitive buttons which allow a driver to define a command corresponding to the prior defined condition. As shown in FIG. 4, by way of example, sixteen command option buttons 90 are presented to the driver each of which correspond to an operating variable which can be controlled by ECU 16. Starting at the top-left corner and working through in rows to the right, the command option buttons 90 correspond to:
engine cruise control engagement;
raise rear hitch;
raise front hitch;
engage rear PTO;
engage front PTO;
engage tractor cruise control;
disengage engine cruise control;
lower rear hitch;
lower front hitch;
disengage rear PTO;
disengage front PTO;
disengage tractor cruise control;
float rear hitch;
float front hitch;
engage auto-guidance; and,
disengage auto-guidance.

In the example shown in FIG. 4 a user has selected the disengage engine cruise control button 92 which is then displayed in bold to positively highlight to the user that this has been selected.

A box 94 for displaying a selected value is displayed but not required for the option of disengaging engine cruise control. Increment buttons 95 are also presented in case a value must be set.

Once satisfied with the selection, the user presses the enter button 96 which completes the command definition process.

It will be appreciated that the layout of buttons and means by which a user can define a macro is not essential to the scope of the invention and many alternatives are envisaged providing a user can define a condition and a command.

The information inputted by the user as described above is transmitted to ECU 16. In the example described with reference to FIGS. 3 and 4 the macro includes the condition of steering angle exceeding 5'. The corresponding command is the disengagement of engine cruise control. Once transmitted to, and stored by, ECU 16, the macro is run either by default or by selection by a driver. In any case, when the described macro is enabled ECU 16 disengages engine cruise control in response to the sensed steering angle exceeding 5'.

A second example of a user defining a macro will now be described with reference to FIGS. 5 and 6. In this example display 72 again displays the same condition setting information as in FIG. 3 described above. In this example the user selects PTO speed button 87 which is shown in bold form thereafter. Following this the user selects the 'less than' logic operator button 89 and then sets a trigger value 84 of 510 rpm using the increment buttons 85. To summarise, the condition for the macro is therefore set as 'PTO speed less than 510 rpm'. To confirm completion of the condition definition the user presses the enter button 88 which causes display 72 to display the command definitions screen shown in FIG. 6.

Due to the set condition being dependant upon PTO speed, the command definition step in this case omits the front and rear PTO engagement buttons. In the example shown the user selects the rear hitch raise button 97 and uses the increment buttons 95 to set a rear hitch height value of '4'. Depending on the specification of the overall system the value entered in box 94 may correspond to an absolute hitch height value or a hitch raise value. The user confirms entry of the command by pressing enter button 96.

Figure 5:
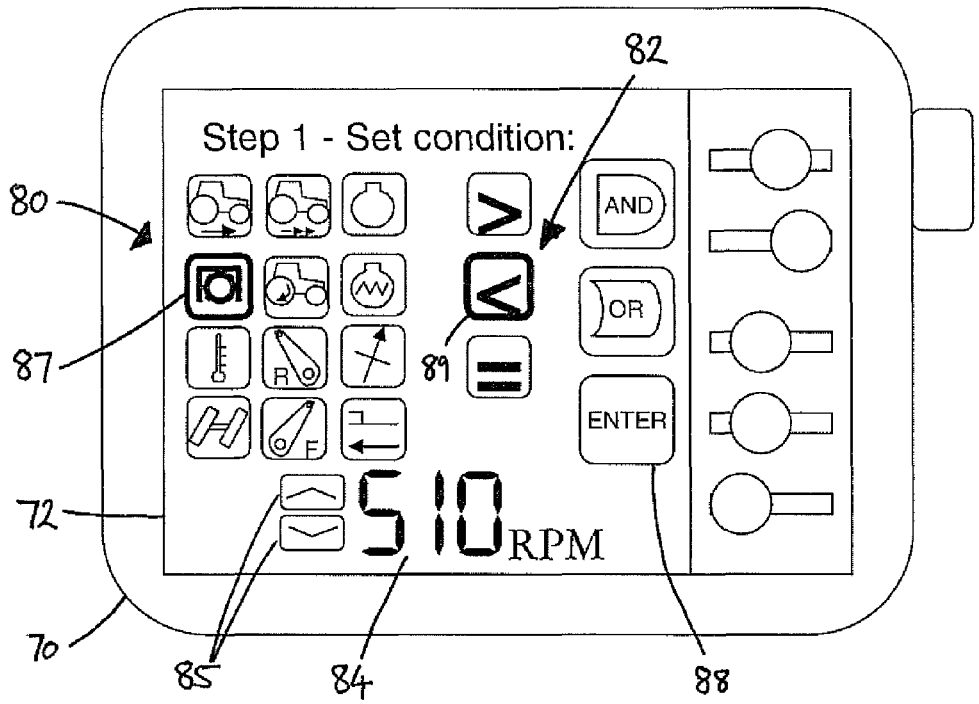
Figure 6:
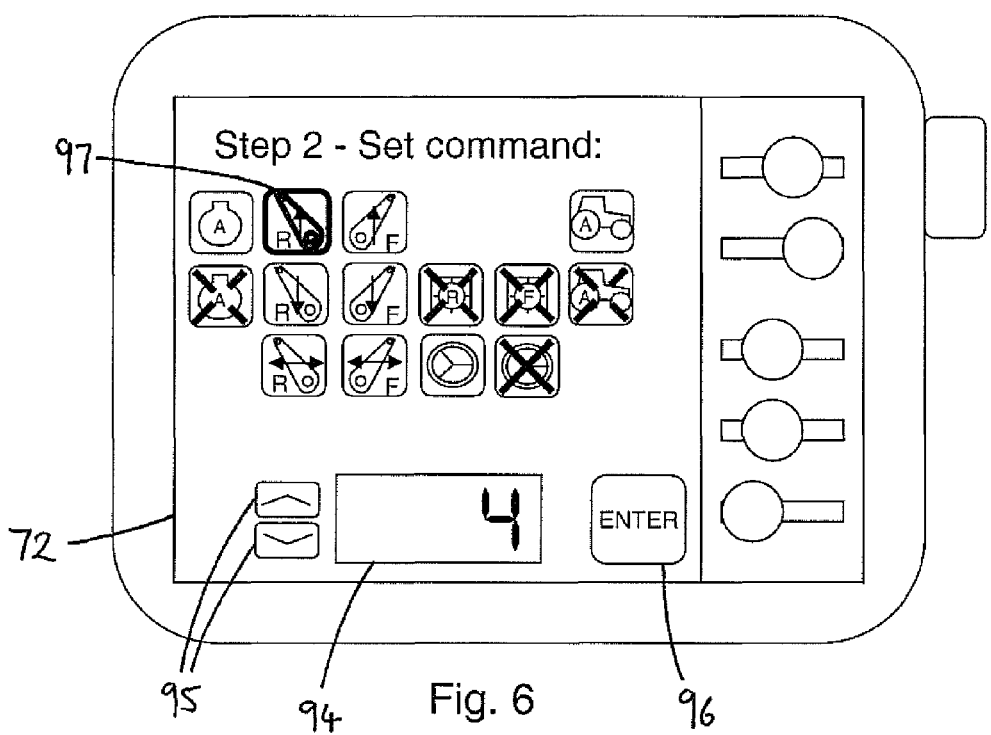
Figure 7:
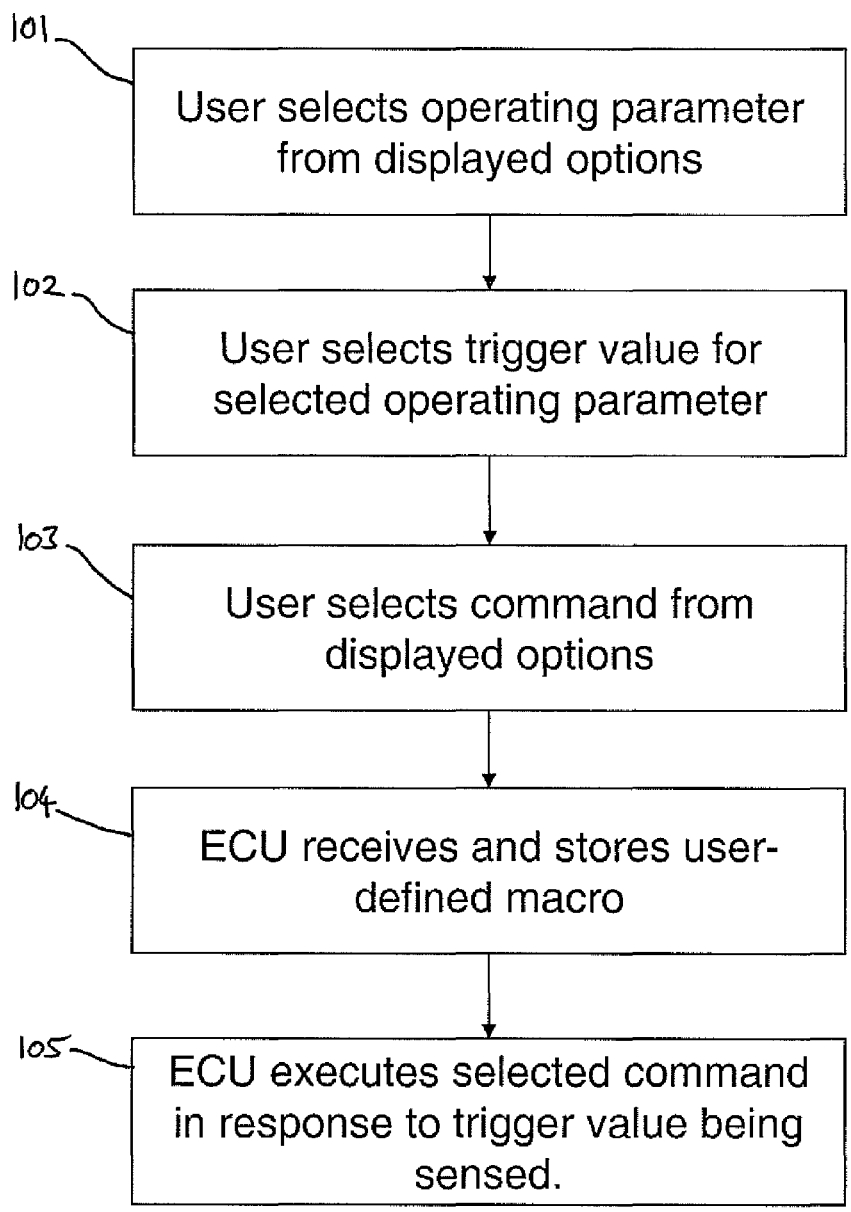
FIG. 7 is a flow chart illustrating a first method in accordance with the invention.

FIG. 7 illustrates the method in accordance with the invention which corresponds with the above described macro entry process with reference to FIGS. 3 to 6. To revisit the process, in a first step 101 the user, which is typically the driver, selects an operating parameter from the displayed options, examples of which are illustrated in FIGS. 3 and 5. As mentioned above, the operating parameters can be considered as input variables which are sensed by the ECU 16.

In a second step the user selects a trigger value corresponding to the selected operating parameter. In the example shown in FIG. 3 the trigger value is set at 5' whereas in the example shown in FIG. 5 the trigger value is set at 510 rpm. It will be appreciated that the units associated with the trigger value depend upon the operating parameters selected.

In a third step 103 the user selects a command from a multitude of options displayed on display 72 as shown in FIGS. 4 and 6. Each command option as described above is associated with an operating function of the tractor, that is a function that is controllable by the ECU. In the example shown in FIG. 4 the selected command is the disengagement of engine cruise control whereas the selected command in FIG. 6 is the raising of rear hitch by four units.

In a forth step 104 the ECU 16 receives and stores the macro defined by the user in steps 101 to 103.

In a fifth step 105 the ECU 16 runs the user-defined macro by executing the selected command (defined in step 103) in response to the trigger value (defined in step 102) being sensed. The ECU 16 may selectively run the macro in accordance with activation commands received from the user.

Download from Internet

Figure 8:
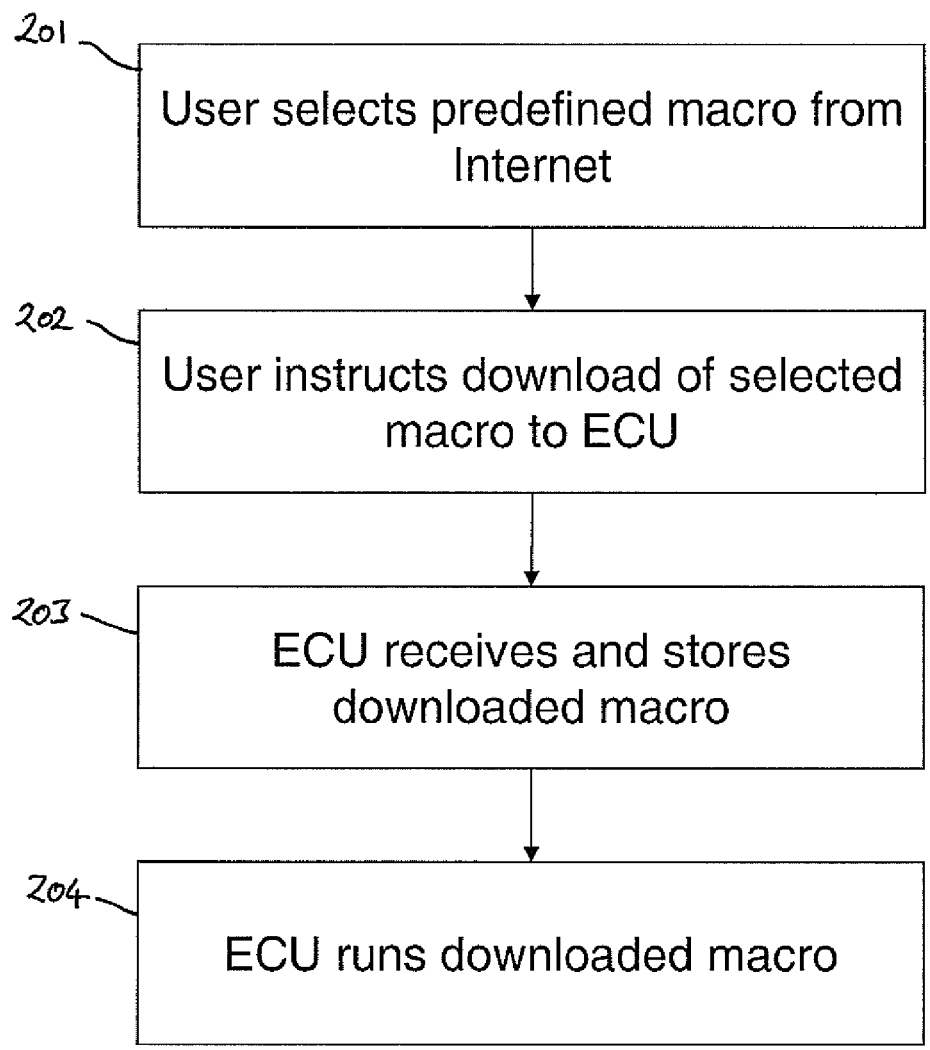
FIG. 8 is a flow chart illustrating a second method in accordance with the invention.

In addition to, or instead of, direct entry of a macro by a user, as described above, the ECU 16 may receive a macro by means of a download process from the Internet. An example of such process is illustrated in FIG. 8 in which in a first step 201 a user selects a predefined macro from the Internet. It should be appreciated that this step can be carried out on any electronic device such as an office PC.

In a second step 202 the user instructs the download of the selected macro to the ECU 16. Typically this is done from the user terminal 70 which has a wireless communications link allowing access to the Internet.

As per the direct entry method described with reference to FIG. 7, in a third step the ECU 16 receives, stores and selectively runs the downloaded macro (steps 203, 204).

Transfer by Data Carrier

Figure 9:
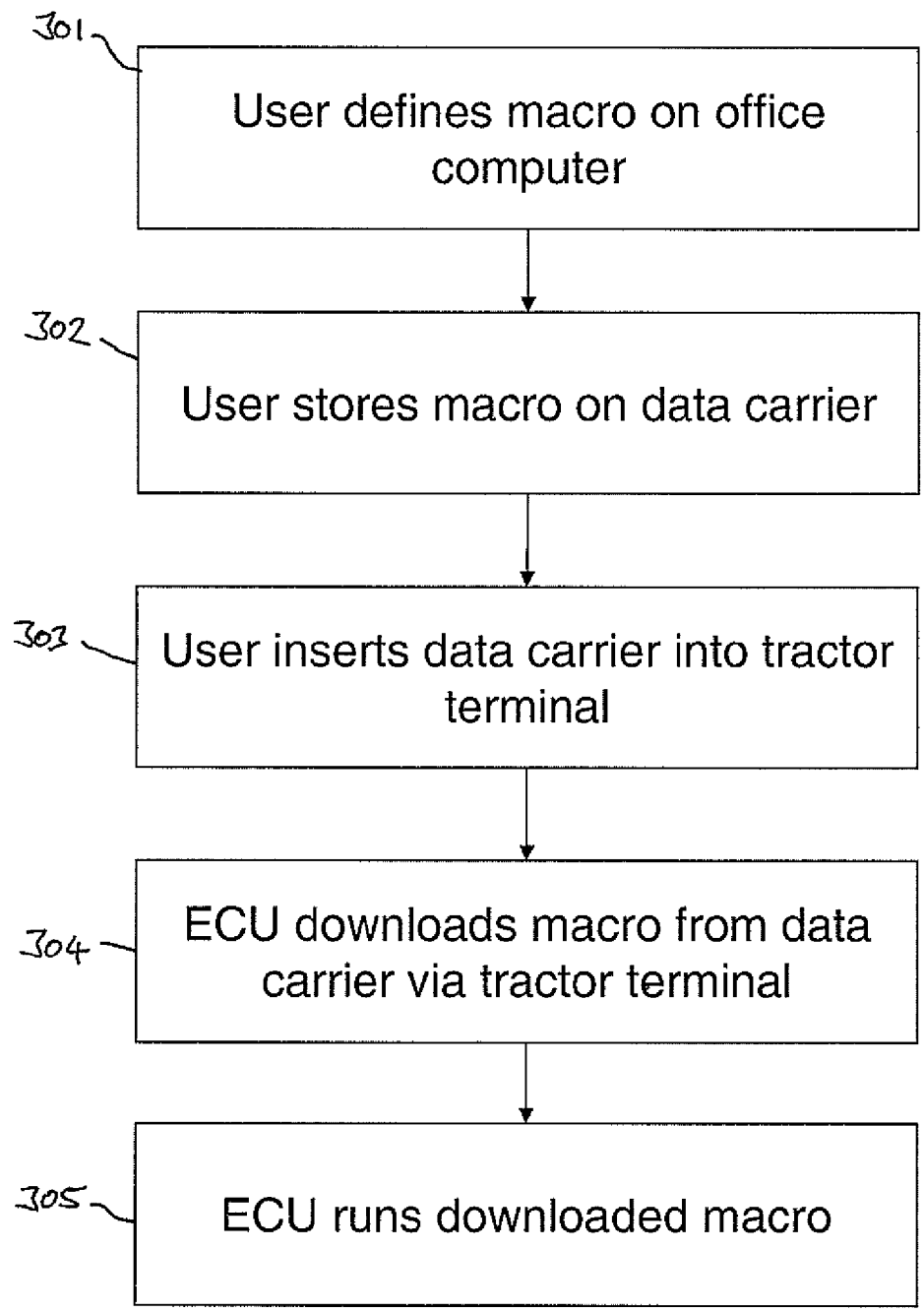
FIG. 9 is a flow chart illustrating a third method in accordance with the invention.

In an alternative process a macro may be transferred from one electronic device such as an office computer (not shown) to the ECU 16 using a physical data carrier. Outlined in FIG. 9 the process commences with a first step 301 in which a user defines a macro on an office computer. In a preferred example, propriety software installed in the office computer may be used and may indeed present a similar display as viewed on the driver terminal 70 as illustrated in FIGS. 3 to 6.

In a second step the user stores the macro on a data carrier such as a SC card or memory stick. The data carrier 78 (see FIG. 2) is then transferred to the driver terminal 70 and inserted therein before the ECU 16 commences a download step whereby the macro is transferred from the data carrier to the ECU 16 via the tractor terminal 70 (steps 303,304).

Once stored on the ECU 16 the downloaded macro can be run as commanded by the user (step 305).

As mentioned above the macro mentioned in this example is defined by the user on an office computer. However it is envisaged that a user may download a predefined macro from the Internet to the office computer and transfer said macro using a data carrier as described above.

In summary, an agricultural tractor control system comprising an ECU is provided in addition to a method of controlling a tractor. The ECU is arranged to receive in real time signals from a plurality of sensors associated with operating functions of the tractor. The ECU is also arranged to output control signals to a plurality of controlled operating components. Macroinstructions, or macros, are inputted to the ECU by a user by direct definition or Internet download for example. Each macro comprises a condition and a command. The condition includes a trigger value and a corresponding input variable sensed by a respective sensor. The command involves the transmission of one of said output control signals to control an operating component in a predetermined manner. The ECU is operable to run said macro during which the command is executed in response to the condition being met.

The invention claimed is:

1. An agricultural tractor control system comprising an electronic control unit (ECU) arranged to receive a plurality of real time operating parameters each associated with operating functions of the tractor, and arranged to output control signals to a plurality of operating components, wherein the ECU is operable to receive and store a user-inputted macro comprising at least one condition and at least one command, the condition including an event of receiving of an operating parameter having a predetermined value and the command comprising the transmission of one of said output control signals, wherein the ECU is operable to run said macro during which the command is executed in response to the condition being met, the system further comprising a user interface device in communication with that ECU, wherein the user interface device is arranged to receive a macro from the user and transmit the macro to the ECU, wherein the user interface device comprises a communications link with a remote electronic device, and wherein the user interface device receives a predetermined macro from the remote electronic device via the communications link when commanded by a user.

2. A control system according to claim 1, wherein the user interface device comprises data entry means which allows the user to define and input the macro.

3. A control system according to claim 2, wherein the user interface device is arranged to allow a user to select, as part of a condition definition process, an operating parameter from a displayed plurality of predetermined operating parameters.

4. A control system according to claim 3, wherein the user interface device is arranged to allow a user to define, as part of the condition definition process, said predetermined value which corresponds with the selected operating parameter.

5. A control system according to claim 2, wherein the user interface device is arranged to allow a user to select, as part of a command definition process, said command from a plurality of predetermined command options.

6. A control system according to claim 1, wherein the user interface device comprises a communications link with a remote or local electronic device, and wherein the user interface device can receive a predetermined macro from the local electronic device via the communications link when commanded by a user.

7. A control system according to claim 1, wherein the user interface device further comprises means to receive a data carrier so that a macro stored on the data carrier can be downloaded to the ECU.

8. A method of controlling an agricultural tractor comprising the steps of:
receiving a plurality of real time operating parameters each associated with operating functions of the tractor;
outputting control signals to a plurality of operating components;
receiving a user-inputted macro comprising at least one condition and at least one command, the condition including the receipt of a predetermined operating parameter value and the command comprising the transmission of one of said output control signals, wherein receiving the user-inputted macro comprises the steps of:
receiving a download command from the user;
downloading a predefined macro from a remote electronic device;
storing said macro; and
executing the command in response to the condition being met.

9. A method according to claim 8, wherein the plurality of real time parameters include at least one of groundspeed, ground acceleration, wheel slip, direction of travel, engine speed, engine temperature, engine load, power takeoff speed, steering angle, rear hitch position, front hitch position and hitch draft.

10. A method according to claim 8, wherein the operating components include at least one of an engine, a transmission, a power takeoff system, a rear hitch system, a front hitch system, a steering system and an auxiliary hydraulic system.

11. A method according to claim 8, further comprising the step of providing macro definition means which permit a user to define and input a macro.

12. A method according to claim 11, wherein the macro definition means includes a plurality of displayed predetermined operating parameters from which the user can select an operating parameter to form a component of the condition.

13. A method according to claim 11, wherein the macro definition means includes a plurality of displayed predetermined command options from which the user can select said command.

14. A method according to claim 11, wherein the macro definition means includes a plurality of displayed logic operators to allow a user to define a relationship between a plurality of conditions corresponding to a single command.

15. A method according to claim 8, wherein said receiving of the macro includes the steps of:
 receiving a data carrier from a user; and,
 reading data from the data carrier to extract a stored macro.

16. A method according to claim 8, wherein the step of receiving of the macro includes the steps of:
 receiving a download command from the user; and
 downloading a predefined macro from a local electronic device.

* * * * *